United States Patent [19]

Barmeier, Jr. et al.

[11] 4,107,601

[45] Aug. 15, 1978

[54] SELF-ADJUSTING EXCITER BAND FOR SHAFT SPEED MAGNETIC PICKUP

[75] Inventors: Harold J. Barmeier, Jr., Ballwin; David A. Wright, Frontenac, both of Mo.

[73] Assignee: National Marine Service, Inc., St. Louis, Mo.

[21] Appl. No.: 761,199

[22] Filed: Jan. 21, 1977

[51] Int. Cl.² .............................................. G01P 3/48
[52] U.S. Cl. .................................... 324/173; 324/200
[58] Field of Search .................... 324/173, 174, 34 R, 324/165; 336/20

[56] References Cited

U.S. PATENT DOCUMENTS

| 3,243,692 | 3/1966 | Heissmeier et al. | 324/174 X |
| 3,560,845 | 2/1971 | Goldberg et al. | 324/34 R |
| 3,641,535 | 2/1972 | Knopf | 324/165 X |
| 3,651,500 | 3/1972 | Weir | 324/173 X |
| 3,783,248 | 1/1974 | Sugden, Jr. | 324/174 X |
| 3,986,118 | 10/1976 | Madigan | 324/174 |

Primary Examiner—Stanley T. Krawczewicz
Assistant Examiner—Vincent J. Sunderdick
Attorney, Agent, or Firm—Bacon & Thomas

[57] ABSTRACT

An exciter for use with a shaft speed magnetic pickup includes a strip of flexible, stretchable, sheet material having a plurality of magnetic elements attached to it that are uniformly spaced along the strip, enabling the magnetic elements to be attached to the exterior of various diameter rotatable shafts by stretching and fastening the strip about the circumference of the shaft close to the magnetic pickup which generates an electrical pulse signal whenever a magnetic element passes by it. The pulse signal is processed to produce a readout of shaft speed. Two magnetic pickups circumferentially spaced about the shaft closer than the circumferential spacing of the magnetic elements are used to provide signals that can be processed to indicate shaft direction of rotation as well as shaft speed.

9 Claims, 5 Drawing Figures

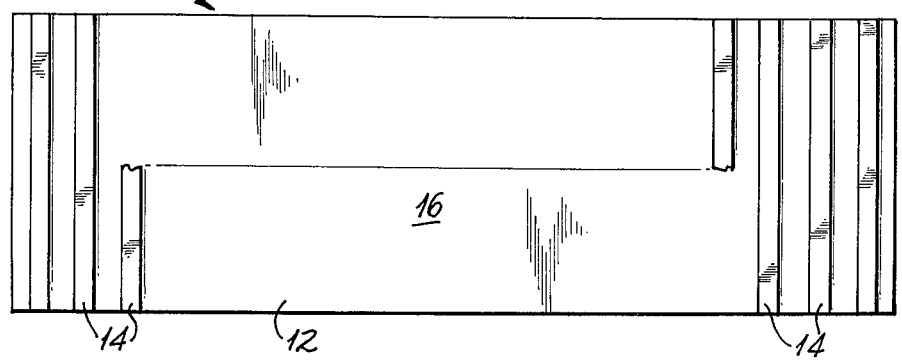
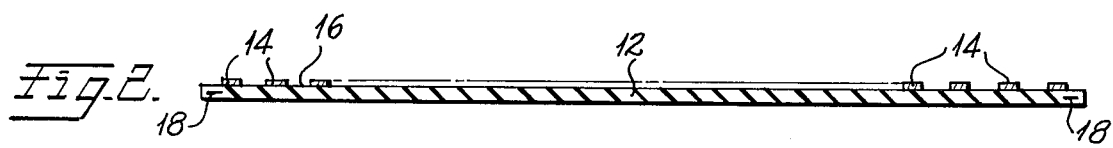
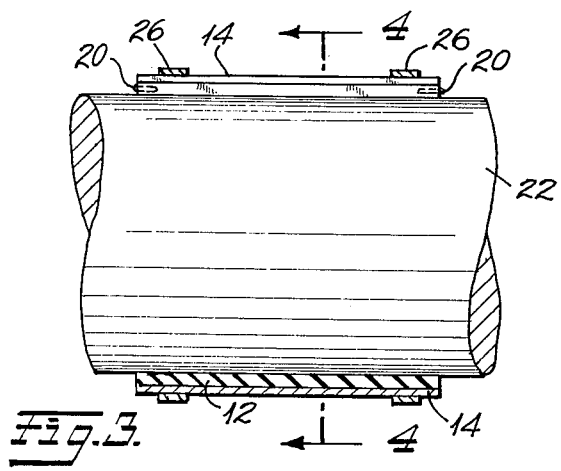
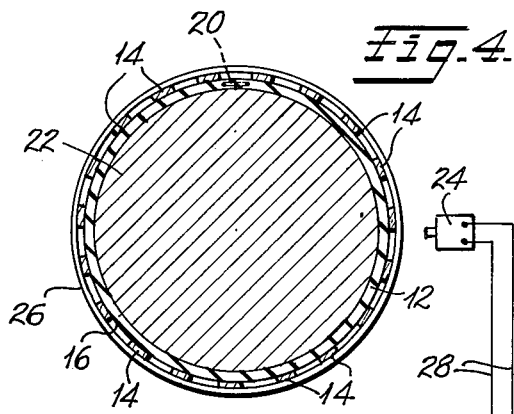
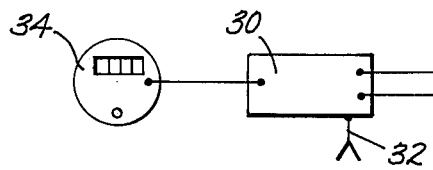
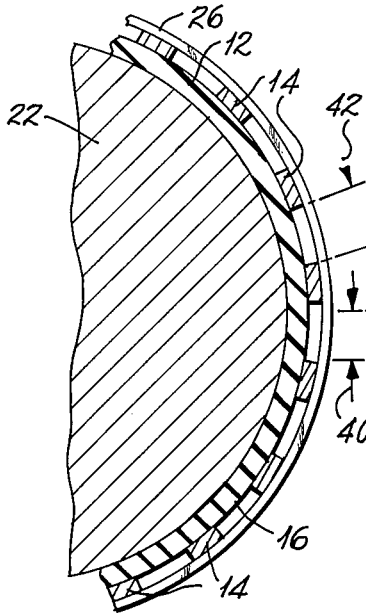
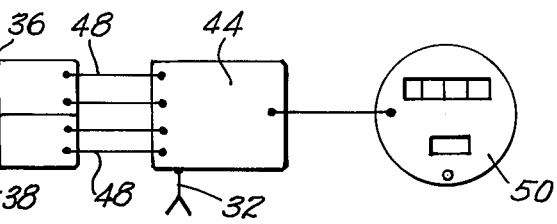

SELF-ADJUSTING EXCITER BAND FOR SHAFT SPEED MAGNETIC PICKUP

BACKGROUND OF THE INVENTION

This invention pertains to the field of electrically sensing the speed of rotating shafts, and more specifically to the magnetic pulse exciter for use with magnetic speed sensing pickup elements used with conventional electronic digital tachometers.

Magnetic pickups are used with various types of electronic tachometers and counting devices for speed and/or count sensing. These pickups generate an electrical pulse to each time a piece of magnetic material passes close to the pickup head. When used in determining the speed of a rotating shaft, a gear is normally affixed to the shaft in such a manner that the gear teeth pass close to the magnetic pickup head as the shaft is rotated. Each gear tooth passing the head then generates an electrical pulse. The rotational speed of the shaft can then be determined from the knowledge of how many teeth are on the specific gear and the rate of the pulses generated. The gear teeth or other magnetic material passing the magnetic pickup are usually referred to as the magnetic exciters.

The problem solved by the present invention is one of placing a magnetic exciter on installed shafts of various diameters without dismantling the shafts, without using precisely machined split gears attached to the shafts, and without using indirect drives to rotate auxiliary pulse generating exciters.

In determining the speed of a slowly turning shaft with a magnetic pickup, uniform spacing of the magnetic exciters around the shaft is desired so that a constant pulse rate is obtained when the shaft is rotating at a fixed RPM. This allows the pulse rate sample time (the period for which the pulses are counted) to be short, allowing a fast response of the electronic readout while still providing an accurate speed indication. If the exciters were not spaced uniformly, more pulses would be counted in one sample period and less in the next as the shaft is rotated. This uneven spacing would therefore produce a changing speed indication because of the varying pulse count, even though the shaft would be turning at a fixed RPM. Longer sample times, counting pulses for many revolutions of the shaft, reduces the errors caused by uneven exciter spacing. Longer sample times are not desirable in many applications as they proportionately slow down the response of the readout to actual changes in speed. Also, it is desirable that a fixed number of these exciters be spaced around the shaft so that the electronic readout unit can have a fixed calibration based on a fixed number of pulses per revolution of the shaft.

In the application of reading shaft RPM where accuracy, fast response and no field calibration of the readout is desired, the magnetic exciters must be of a fixed number with uniform spacing. Shaft diameters have a wide range of variation due to horsepower ratings of engines and specific applications. To accommodate magnetic pickups on varying size shafts, split gears of a known number of teeth have been precisionally machined and mounted to the shafts. A second current method is to affix a belt drive from the shaft to a separate pulley of the same diameter as the shaft. This pulley ten drives the magnetic exciter gear of a fixed number of teeth. These methods require a precision gear or pulley machined and fabricated for each individual shaft diameter.

Finally, while magnetic pickups are capable of providing speed signals to tachometers, the direction of shaft rotation usually must be obtained by different means, because the magnetic pickup is insensitive to direction of shaft rotation.

SUMMARY OF THE INVENTION

A fixed number of magnetic exciter links or bars are fastened with uniform spacing to an elastic or stretchable strip of sheet material. This strip can then be placed around any diameter shaft and stretched until it covers the complete shaft circumference. The magnetic exciters become uniformly spaced as the strip is stretched around the shaft. The strip is then secured with a small clip. Essentially a gear of varying diameter is made out of the shaft and magnetic exciter links. Strip and links are then more permanently fastened to the shaft by means of stainless steel strapping. This exciter strip design allows a standard exciter strip consisting of the exciter links mounted on an elastic strip to fit shafts of varying diameter eliminating the precision machining required by the former methods.

A pair of magnetic pickups having magnetic sensitive elements spaced apart a distance less than the circumferential spacing of the links is used with signal phase sensing means (lead and lag) to sense the direction of shaft rotation.

DETAILED DESCRIPTION OF THE PREFERRED EMBODIMENT

The Drawings

In the drawings of the application:

FIG. 1 is a plan view of a magnetic exciter constructed in accordance with the present invention;

FIG. 2 is a side elevational view of the exciter shown in FIG. 1;

FIG. 3 shows the exciter assembled to a shaft;

FIG. 4 shows a view taken along line IV—IV in FIG. 3, along with a magnetic pickup and speed readout schematically illustrated; and FIG. 5 shows a shaft speed and direction sensing arrangement using the exciter in combination with a dual magnetic pickup.

Detailed Description

With reference to the drawings, FIGS. 1 and 2 show the exciter 10 constructed in accordance with the present invention. A flexible strip 12 that is uniformly stretchable longitudinally (left and right in FIGS. 1 and 2) has links or bars 14 of magnetic material fastened to one face 16 thereof. Preferably strip 12 is a rubber sheet and links 14 could be adhesively bonded or embedded in the strip 12, or could otherwise be secured thereto by any convenient means. Preferably, the links 14 extend substantially across the width of the strip 12, but they do not need to be as long as they are illustrated. They are uniform in magnetic properties and are of equal dimensions, particularly along the length of the strip 12. That is to say, the links 14 are of generally uniform width in the direction along the length of strip 12.

Slots 18 are provided for receiving a small fastener such as a metal clip 12 (FIG. 4) used to hold the strip to a rotatable shaft 22, the speed of which is to be measured. Other methods of fastening the ends of the strip to the shafts are envisioned also, such as snaps, Velcro strips, or any other form of fastener suitable for the intended purpose.

The links 14 are evenly spaced along the strip 12, and the position of each end link on the strip is calculated so that when the strip is stretched and wrapped about a shaft 22 and secured thereto in assembled position, all the links, including the end links, are substantially evenly spaced circumferentially about the shaft 22.

The strip 12, being flexible and stretchable along its length, can be wrapped about a range of shaft diameters in the manner illustrated in FIGS. 3 and 4. Regardless of the shaft diameter, the strip 12 will stretch within limits over its circumference and the links 14 will remain evenly spaced about the shaft. This is important to ensure proper signal generation at a magnetic pickup head 24 shown in FIG. 4. Pickup 24 generates an electrical pulse signal whenever a piece of magnetic material passes close to it. Stainless steel bands 26 are finally wrapped about the strip 12 and links 14 to hold the exciter securely about the shaft 22.

In FIG. 4, the magnetic pickup head 24 is connected by electrical lines 28 to a control and signal processing apparatus 30 provided with an electrical power supply 32. The output from apparatus 30 drives a digital tachometer 34 which optically displays the speed of rotation of shaft 22 by using the processed signal from apparatus 30.

Control and signal processing apparatus 30 is generally conventional, and includes usually a provision for receiving multiple inputs from multiple magnetic pickups; means for selecting specific inputs; an input gate for feeding pulse signals from pickup 24 to a counter for a precise sampling period; a sequence controller for generating required timing signals for the display unit; a clock for providing a time base; a counter for counting pulses received from the input gate during a sampling period; a storage register, comparator and dead band circuit for holding the signal value received from the counter, comparing the value in the counter to the value of the storage register, and prohibiting update of the storage register unless the difference is greater than the dead band; and a readout driver for causing the speed reading from the storage register to be displayed in the display unit. These various control and processing components are not illustrated, since they do not, per se, constitute subject matter to be claimed in this application at the present time.

In FIG. 5, the exciter strip 12 with links 14 spaced apart circumferentially a predetermined amount 42 is used in combination with dual magnetic pickups 36, 38. The gap 40, which represents the circumferential spacing of pickups 36, 38 relative to the shaft 22, between the pickups is less than the circumferential space 42 between links 14. The output from pickups 36, 38 is fed to the control and processing unit 44 via electrical leads 48. A power supply 32 is provided, and the output of unit 44 is conducted to a digital tachometer 50, which also includes a display for direction of rotation of shaft 22. Control and signal processing unit 44 in this instance includes a sequence indicator (not illustrated) for determining whether the magnetic pulse resulting from links 14 passing pickup 36 leads or lags the pulse generated at pickup 38. This provides a signal that indicates whether shaft 22 is turning in one direction or the other, depending whether a lead or lag signal is processed through unit 44.

The links 14 may be magnetized themselves or may be made of highly permeable material that will distort an adjacent magnetic field. The use of either type of arrangement will depend upon the particular type of magnetic pickup used and the signal processing arrangement. The word "magnetic", therefore, when used in connection with the links 14, is intended to indicate either arrangement.

What is claimed is:

1. An exciter for use with a shaft speed magnetic pickup comprising:
   (a) a flexible strip of material that is uniformly stretchable at least along its length, the strip having opposite ends and being adapted to be wrapped about and secured to a rotatable shaft;
   (b) a plurality of separate, substantially uniformly spaced magnetic elements secured to the strip so as to face towards one side of the strip along its length;
   (c) fastening means for holding the ends of the strip in predetermined relationship with respect to each other when the strip has been wrapped about a shaft; and
   (d) the magnetic elements most adjacent each end of the strip being spaced from the respective strip ends such that when the strip ends are held together in said predetermined relationship all the magnetic elements are substantially evenly spaced from one another.

2. The exciter according to claim 1, including at least one flexible strapping element wrapped tightly about the strip and magnetic elements, and securing said strip and elements to the shaft.

3. The exciter according to claim 1, including a pair of magnetic pickups adjacent the shaft close to the strip, the pickups each generating an electrical pulse signal when a piece of magnetic material passes closely thereby, the pickups being spaced circumferentially about the shaft a distance less than the spacing between the magnetic elements.

4. The method of measuring the speed of a rotating shaft comprising:
   (a) fastening a plurality of separate magnetic elements to a strip of flexible sheet material so the elements all face towards one side of the strip, the strip being uniformly stretchable along its length, the elements being substantially evenly spaced along the strip between its ends;
   (b) wrapping the strip lengthwise about a rotatable shaft that has a circumference at least as great as the length of the strip and fastening the strip so that its ends lie in predetermined relationship relative to each other and so that the magnetic elements are substantially evenly spaced about the circumference of the shaft, including the elements adjacent the ends of the strip, with the magnetic elements facing away from the shaft;
   (c) placing a magnetic pickup electrically connected to suitable control and processing circuitry adjacent the shaft and close to the strip, the pickup generating an electrical pulse signal whenever a magnetic element passes close to the pickup;
   (d) driving the shaft in rotation; and
   (e) processing the electrical pulse signals produced as a result of the magnetic elements passing close to the magnetic pickup when the shaft is rotated to produce a signal representative of shaft speed.

5. The method of measuring the speed and direction of rotation of a rotating shaft comprising:

(a) attaching a plurality of separate magnetic elements to one surface of a strip of flexible sheet material that is uniformly stretchable along its length, with the elements being substantially evenly spaced along the strip between its ends;

(b) wrapping the strip lengthwise about a rotatable shaft that has a circumference at least as great as the length of the strip and fastening the strip so that its ends lie in predetermined relationship relative to each other and so that the magnetic elements are substantially evenly spaced about the circumference of the shaft, including the elements adjacent the ends of the strip, with the magnetic elements facing away from the shaft;

(c) placing a pair of magnetic pickups adjacent the shaft close to the strips, the pickups being spaced circumferentially about the shaft a distance less than the circumferential spacing between the magnetic elements, the pickups each generating an electrical pulse signal whenever a piece of magnetic material passes closely thereby and being connected to suitable control and processing circuitry for processing the electrical pulse signals into a shaft speed indicating signal and a shaft direction of rotation signal;

(d) driving the shaft in rotation; and (e) processing the electrical pulse signal resulting from the magnetic elements passing the pickups into signals representative of shaft speed and direction of shaft rotation.

6. The method according to claim 5, wherein the sequence of the electrical pulse signals produced by the magnetic pickups is used to produce the signal representative of direction of shaft rotation.

7. The method of measuring the direction of rotation of a rotatable shaft comprising:

(a) affixing a plurality of magnetic elements circumferentially about the shaft in uniformly spaced order;

(b) placing a pair of magnetic pickups adjacent the shaft in the vicinity of the magnetic elements, the pickups being spaced circumferentially about the shaft a distance less than the circumferential spacing between the magnetic elements, the pickups each generating an electrical pulse signal when a piece of magnetic material passes closely thereby and being connected to suitable control and processing circuitry for processing the electrical pulse signals into a signal representative of shaft direction of rotation;

(c) driving the shaft in rotation;

(d) processing the electrical pulse signals resulting from the magnetic elements passing the pickups into signals representative of shaft direction of rotation; and (e) utilizing said signals representative of shaft direction of rotation to produce a visual readout indicative of shaft direction of rotation.

8. The method according to claim 7, wherein the sequence of electrical pulse signals generated by the magnetic pickups is used to produce the said signal representative of direction of shaft rotation.

9. The method according to claim 8, including also processing the electrical pulse signal from the magnetic pickups into shaft speed indicative signals and using the latter signals to produce a visual readout indicative of shaft speed.

* * * * *